US008046759B2

(12) United States Patent  
de Rose et al.

(10) Patent No.: US 8,046,759 B2  
(45) Date of Patent: Oct. 25, 2011

(54) RESOURCE ALLOCATION METHOD AND SYSTEM

(75) Inventors: Cesar de Rose, Porto Alegre RS (BR); Marco Aurelio Stelmar Netto, Porto Alegre RS (BR); Caio Northfleet, Porto Alegre RS (BR); Walfredo Cirne Filho, Campina Grande (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1679 days.

(21) Appl. No.: 11/213,614

(22) Filed: Aug. 26, 2005

(65) Prior Publication Data

US 2006/0048161 A1    Mar. 2, 2006

(30) Foreign Application Priority Data

Aug. 26, 2004    (GB) .................................. 0419009.6

(51) Int. Cl.  
    G06F 9/46    (2006.01)  
    G06F 15/16    (2006.01)
(52) U.S. Cl. ......... 718/101; 709/201; 709/208; 709/217
(58) Field of Classification Search ........................ None  
    See application file for complete search history.

(56) References Cited

U.S. PATENT DOCUMENTS

| | | | | | |
|---|---|---|---|---|---|
| 5,129,084 | A | * | 7/1992 | Kelly et al. | 718/104 |
| 5,187,790 | A | * | 2/1993 | East et al. | 719/316 |
| 5,321,841 | A | * | 6/1994 | East et al. | 718/107 |
| 5,881,232 | A | * | 3/1999 | Cheng et al. | 709/217 |
| 5,978,829 | A | * | 11/1999 | Chung et al. | 718/102 |
| 5,999,963 | A | * | 12/1999 | Bruno et al. | 718/104 |
| 6,003,061 | A | * | 12/1999 | Jones et al. | 718/104 |
| 6,067,545 | A | * | 5/2000 | Wolff | 707/10 |
| 6,101,508 | A | * | 8/2000 | Wolff | 709/223 |
| 6,112,225 | A | * | 8/2000 | Kraft et al. | 709/202 |
| 6,434,589 | B1 | * | 8/2002 | Lin et al. | 718/100 |
| 6,438,553 | B1 | * | 8/2002 | Yamada | 707/10 |
| 6,499,031 | B1 | * | 12/2002 | Hopmann et al. | 707/8 |

(Continued)

FOREIGN PATENT DOCUMENTS

EP    0 840 216 A2    5/1998

(Continued)

OTHER PUBLICATIONS

Cirne, W., et al., "Running Bag-of-Tasks Applications on Computational Grids: The MyGrid Approach," *Proceedings of the 2003 International Conference on Parallel Processing*, pp. 407-416 (Oct. 6-9, 2003).

(Continued)

*Primary Examiner* — Emerson Puente  
*Assistant Examiner* — Adam Lee

(57) ABSTRACT

A method of executing a bag of tasks application in a cluster over a distributed computing system, the cluster having a cluster resource manager. The method includes requesting that the cluster resource manager authorize access by a remote user of the distributed computing system to any idle nodes of the cluster, submitting a bag of tasks slave process to the cluster resource manager, loading the bag of tasks slave process in one of the idle nodes without an allocation operation, sequentially scheduling tasks from the bag of tasks to the bag of tasks slave process, and executing the bag of tasks slave process either until finished or until the node in which the bag of tasks slave process is loaded is required owing to a local allocation request.

8 Claims, 2 Drawing Sheets

U.S. PATENT DOCUMENTS

| | | | |
|---|---|---|---|
| 6,584,489 B1* | 6/2003 | Jones et al. | 718/104 |
| 6,597,956 B1* | 7/2003 | Aziz et al. | 700/3 |
| 6,681,239 B1* | 1/2004 | Munroe et al. | 718/104 |
| 6,886,035 B2* | 4/2005 | Wolff | 709/219 |
| 6,898,634 B2* | 5/2005 | Collins et al. | 709/226 |
| 6,988,272 B1* | 1/2006 | Iwao et al. | 719/316 |
| 7,082,474 B1* | 7/2006 | Hubbard | 709/245 |
| 7,133,842 B2* | 11/2006 | Harif | 705/37 |
| 7,155,475 B2* | 12/2006 | Agnoli et al. | 709/201 |
| 7,243,352 B2* | 7/2007 | Mandava et al. | 718/104 |
| 7,284,061 B2* | 10/2007 | Matsubayashi et al. | 709/229 |
| 7,376,693 B2* | 5/2008 | Neiman et al. | 709/201 |
| 7,383,396 B2* | 6/2008 | Wyman | 711/141 |
| 7,496,654 B2* | 2/2009 | Corbin et al. | 709/224 |
| 7,526,767 B1* | 4/2009 | Rhee et al. | 718/104 |
| 7,574,490 B2* | 8/2009 | Smith | 709/220 |
| 2003/0172146 A1* | 9/2003 | Collins | 709/223 |
| 2006/0143617 A1* | 6/2006 | Knauerhase et al. | 718/104 |

FOREIGN PATENT DOCUMENTS

| | | |
|---|---|---|
| EP | 0840216 A1 | 5/1998 |
| WO | WO-02/065230 A | 8/2002 |
| WO | WO 02/065230 A2 | 8/2002 |

OTHER PUBLICATIONS

Sullivan III, W.T., et al., "A new major SETI project based on Project Serendip data and 100,000 personal computers," *Astronomical and Biochemical Origins and the Search for Life in the Universe*, Proceedings of the Fifth Intl. Conf. on Bioastronomy = IAU Colloq. No. 161 (1997).

Cirne et al~"Running Bag-of-Tasks Applications on Computational Grids: The MyGrid Approach"~Proc 2003 Int'l Conference on Parallel Processing~pp. 407-406.

Sullivan et al~"A new major SETI project based on Project Serendip data and 100,000 personal computers"~Proc of the 5th Int'l Conf on Bioastronorny (1997)~pp. 4.

* cited by examiner

RESOURCE ALLOCATION METHOD AND SYSTEM

FIELD OF THE INVENTION

The present invention relates to a resource allocation method and system, of particular but by no means exclusive application in allocating resources in the execution of bag of tasks applications.

In the description that follows, it should be understood that the term "cluster" refers to a space-shared, distributed memory computing system.

BACKGROUND OF THE INVENTION

A "Bag of Tasks" (BoT) application is a technique used in distributed memory computing systems, in which a quantity of work is divided into separate tasks that are placed in a list or "bag". Each processor takes one of the tasks from the bag and, when that task is completed, takes another.

According to existing techniques, when a user wants to run a BoT application on a cluster (which is usually connected to a Grid), he or she submits a request that specifies the number of nodes in the cluster and the duration of the Job. Such a request is known as a "rigid request". All nodes are then made available simultaneously for the BoT application.

However, the computing resources of such a distributed computing system may be neither homogeneous nor dedicated, so when an application is executed in such a system the allocation time must be specified in the resource request sent to a cluster resource manager. It is difficult to estimate the execution time of an application in such systems, which makes "rigid requests" impracticable. Furthermore, a BoT application does not require simultaneous access to all the processors in the cluster, so requiring that it do so delays the execution of the BoT application.

The user could in principle address this problem by submitting one request per task, but most cluster administrators limit the number of requests a user can have pending at any time, which limits the value of this approach.

One existing technique that attempts to overcome this limitation involves probing the cluster resource manager about the largest request that can currently be fulfilled, sending that request, and then repeating this strategy until the BoT application finishes. However, this approach is restricted by any policies in place in the cluster that limit individual resource consumption; indeed, such policies are often enforced even if there are idle resources.

SUMMARY OF THE INVENTION

In a first broad aspect, therefore, the present invention provides a method of executing a bag of tasks application in a cluster over a distributed computing system, the cluster having a cluster resource manager. The method comprises:
 requesting that the cluster resource manager authorize access by a remote user of the distributed computing system to any idle nodes of the cluster;
 submitting a bag of tasks slave process to the cluster resource manager;
 loading the bag of tasks slave process in one of the idle nodes without an allocation operation;
 sequentially scheduling tasks from the bag of tasks to the bag of tasks slave process; and
 executing the bag of tasks slave process either until finished or until the node in which the bag of tasks slave process is loaded is required owing to a local allocation request.

It will be appreciated by those in the art that the bag of tasks slave process will be finished when there are no more tasks in the bag. It will also be appreciated that the cluster may form a part of or constitute the distributed computing system.

In some embodiments, the bag of tasks slave process is one of a plurality of bag of tasks slave processes. The method may then include submitting the bag of tasks slave processes to the cluster resource manager, loading as many of the bag of tasks slave processes as there are idle nodes in respective idle nodes without an allocation operation, sequentially scheduling tasks from said bag of tasks to said bag of tasks slave processes, and executing each of the loaded bag of tasks slave processes either until finished or until the node in which the respective bag of tasks slave process is loaded is required owing to a local allocation request.

In one particular embodiment, the distributed computing system comprises a Grid.

Thus, in this aspect the invention employs a transparent allocation strategy to exploit idle cluster resources to execute bag of tasks applications in a distributed computing environment (such as a Grid). This allows the distributed computing system to use all idle resources from a cluster without a formal allocation operation; local user applications that request cluster nodes through standard allocation preempt remote distributed computing system Jobs.

Cluster utilization is usually nowhere near 100 percent, especially in large machines located in universities or research centers. Even if cluster utilization is high, there generally remain idle resources that are not be allocated to the local demand owing to workload characteristics or scheduler limitations. This is known as external fragmentation in resource management. This surplus, in the present aspect, is exploited by the distributed computing system architecture to execute remote applications without requiring the formal allocation of the nodes. Not all distributed computing system applications can cope with the abrupt loss of the resources to a local allocation request (i.e. preemption) and for most of them it would not compensate to be remotely dispatched if a minimum period of utilization could not be guaranteed.

However, a BoT application can handle the abrupt loss of resources, as a BoT is a master-slave application: the master is responsible for managing and scheduling the tasks in the bag and the slaves merely request and execute these tasks until no more tasks remain. The number of dispatched slaves may vary and, if a slave is interrupted, the master reschedules the unfinished task. This strategy is referred to as "transparent" because the distributed computing system uses all available idle resources at request time without a formal allocation operation to the cluster resource manager (CRM). This means that the resources are not allocated (blocked) for the distributed computing system by the CRM. The CRM is aware of what resources are being used at a given time because it must still allow the remote distributed computing system user to log to and load its BoT application on the idle nodes for execution but, because the slave processes are not the subject of formal allocation operations, the nodes running the BoT remain free from the point of view of the CRM, and may receive a local cluster allocation at any time. It will be appreciated that, if this occurs, a BoT slave process running in the node will be killed, which will slow (or stop) the execution of the BoT application. However, this is not a problem since the work lost when a BoT slave is killed is rescheduled by the master BoT to other running slave process.

It will be appreciated that BoT applications—and hence this aspect of the invention—can be employed in many areas, including data mining, massive searches (such as key breaking), parameter sweeps, simulations, fractal calculations, computer imaging and computational biology.

In one embodiment, the method includes identifying any newly idle nodes, submitting a further bag of tasks slave process to the cluster resource manager for each of any newly idle nodes, and loading each of said further bag of tasks slave processes in one of said newly idle nodes without an allocation operation. This is preferably done by notifying a resource manager of the distributed computing system of any newly idle nodes (such as by means of one or more node agents).

According to another broad aspect, the invention provides a distributed computing system for executing a bag of tasks application. The system comprises a resource manager and a cluster having a cluster resource manager. The resource manager is operable to request that the cluster resource manager authorize access by a remote user of the distributed computing system to any idle nodes of the cluster and to submit a bag of tasks slave process to the cluster resource manager, and the cluster resource manager is operable to load the bag of tasks slave process in one of the idle nodes without an allocation operation, to sequentially schedule tasks from the bag of tasks to the bag of tasks slave process, and to execute the bag of tasks slave process either until finished or until the node in which the bag of tasks slave process is loaded is required owing to a local allocation request.

It will be appreciated that, in use, the components of the distributed computing system may change with time, as nodes of the cluster may leave or join the distributed computing system.

In some embodiments, the bag of tasks slave process is one of a plurality of bag of tasks slave processes, the resource manager is operable to submit the bag of tasks slave processes to the cluster resource manager, and the cluster resource manager is operable to load as many of the bag of tasks slave processes as there are idle nodes in respective idle nodes without an allocation operation, sequentially schedule tasks from the bag of tasks to the bag of tasks slave processes, and execute each of the loaded bag of tasks slave processes either until finished or until the node in which the respective bag of tasks slave process is loaded is required owing to a local allocation request.

In one particular embodiment, the distributed computing system comprises a Grid.

In still another aspect of the invention, there is provided a computer readable medium provided with program data that, when executed on a distributed computing system, implements the method of the first aspect described above.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

Figure 1:
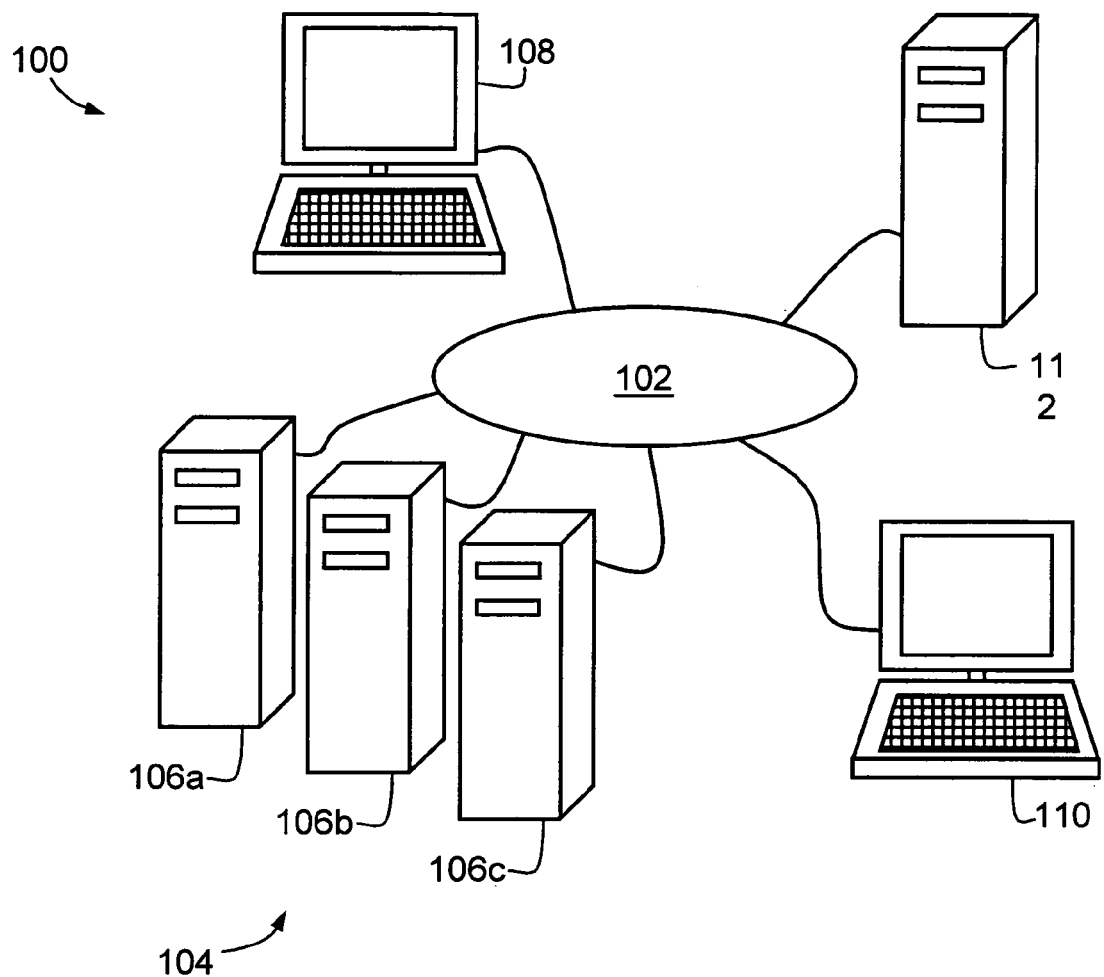
FIG. 1 is a schematic view of a distributed computing system according to a first embodiment of the invention with a communications network.

A distributed computing system in the form of a Grid according to a first embodiment of the invention is shown schematically at 100, together with a communications network 102, in FIG. 1. The Grid 100 includes a cluster 104 (having individual computer nodes 106a, 106b and 106c), remote Grid user computers 108, 110 and server 112. The cluster 104 and each of the user computers 108, 110 can communicate electronically with each other when necessary by means of the communications network 102.

The users are remote with respect to the cluster 104. The communications network 102 can be in the form of essentially any computer network architecture, including an intranet, a LAN or indeed the internet.

It will be understood by those in the art that, in general, free cluster resources or nodes can dynamically join and leave the Grid, though the Grid must be aware of which resources are in the Grid at any time so that it can dispatch tasks to those resources. This means, however, that—although nodes 106a, 106b and 106c are described herein as constituting a cluster—the Grid need not see these nodes as a cluster.

The server 112 includes (and—in use—runs) a grid resource manager (GRM) program; cluster 104 similarly includes a cluster resource manager (CRM) that in use runs on a node termed the "front-end node"; in practice, the front-end node can be any of nodes 106a, 106b and 106c. The CRM allows the Grid (and the Grid users) to access the nodes.

When a remote Grid user (at either of remote user computers 108 or 110) wishes to execute a BoT application, the user's request is initially handled by the GRM. The procedure follows the steps shown in flow diagram 200 in FIG. 2.

At step 202, the Grid user submits the BoT job from their remote user computer 108 or 110 to the GRM running on server 112. At step 204, GRM asks the CRM to authorize access by the Grid user to any idle nodes of the cluster 104. At step 206, the CRM checks the user's rights to receive this access and, at step 208, it is determined whether the user has the appropriate rights. If the user does not have the appropriate rights, at step 210 the user is denied the requested access and at step 226 the procedure ends.

If the user does have the appropriate rights, at step 212 the GRM submits BoT slave processes to the CRM. As many slave processes are submitted to the CRM as there are idle nodes (as determined at step 204). At step 214, the BoT slave processes are loaded in the idle nodes of cluster 104, without a formal allocation operation to the CRM.

At step 214, the BoT slave processes are executed. A master BoT process, which in use runs on any workstation that is a part of the Grid, manages the slave processes and schedules (at step 216) a task from the bag to each of the slave processes.

If the master BoT process were to stop prematurely, the whole Grid application would also stop. (This is not so for slave processes, since any other running slave could run the stopped task.) Consequently, the master BoT process is executed on a stable node of the Grid (viz. computer 108, computer 110 or server 112) rather than on a cluster node, since cluster nodes may leave and join the Grid.

The number of dispatched slave processes may increase, since the number of idle nodes may increase: this is explained below. Also, any of the nodes on which a slave process is running may be preempted (i.e. allocated by the cluster to a local process), since these nodes have not themselves be the subject of an allocation operation; this step is shown at step 218, but it should be understood that step 218 refers separately to each slave process. Such preemption will typically occur when a local user (i.e. a user of any one of nodes 106a, 106b and 106c of cluster 104) makes a local allocation request, indicating that he or she wishes to run a process on one of those nodes. If this does not occur for any particular node, the slave process on that node can continue until its task is completed (see step 220) then—if any tasks remain in the bag—return to step 216 where another task is scheduled to it. Thus, if a slave process is not preempted and hence killed, it will continue to process tasks sequentially until no more tasks remain in the bag and the procedure ends at step 226.

At step 218 (which, as noted above, refers separately to each slave process), if a slave process is preempted owing to its corresponding node being the subject of a local allocation request, at step 224 that slave process is killed and the task that was scheduled to that slave process returned to the bag so that the master process can reschedule it to some other slave process.

If, at step 222, there are no remaining tasks in the bag, the procedure ends at step 226.

Preemption reduces the number of idle nodes available to a remote user. However, once the local user process that prompted the preemption is complete, the node used for that process will commonly become idle again and hence available to the remote user. According to this embodiment, the GRM is informed whenever a node becomes idle so that a further slave process can be executed on the newly idle node. This is done as follows.

A "node agent" is executed on each node whenever that node becomes idle; the respective node agent is turned off when its node is allocated to a local user. When the computer time allocated to a local user commences, the CRM executes a pre-processing script that includes a list of the nodes allocated to that local user. This script turns off the node agent of each node allocated to that local user. When the computer time allocated to the local user finishes, the CRM executes a post-processing script and executes a node agent in each node the user has released. These node agents each sends a message to the GRM advising the GRM that their respective nodes are now idle. The GRM is hence able to submit one or more further bag of tasks slave process to the CRM for execution on the newly idle node or nodes.

Figure 3:
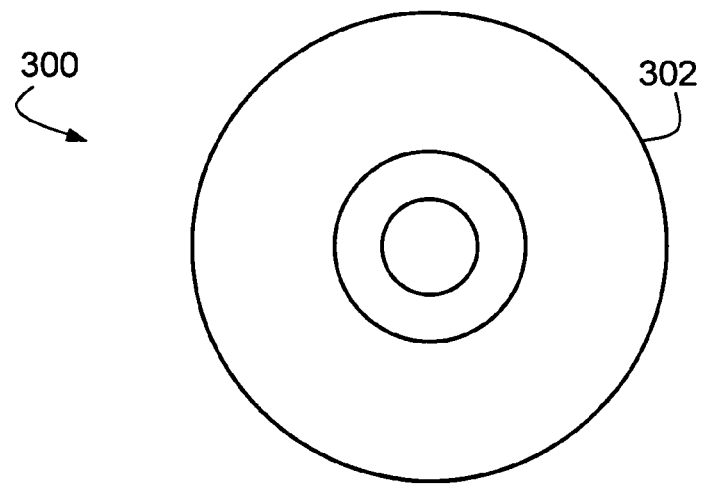
FIG. 3 is a schematic view of a data storage medium according to another embodiment of the invention.
Figure 2:
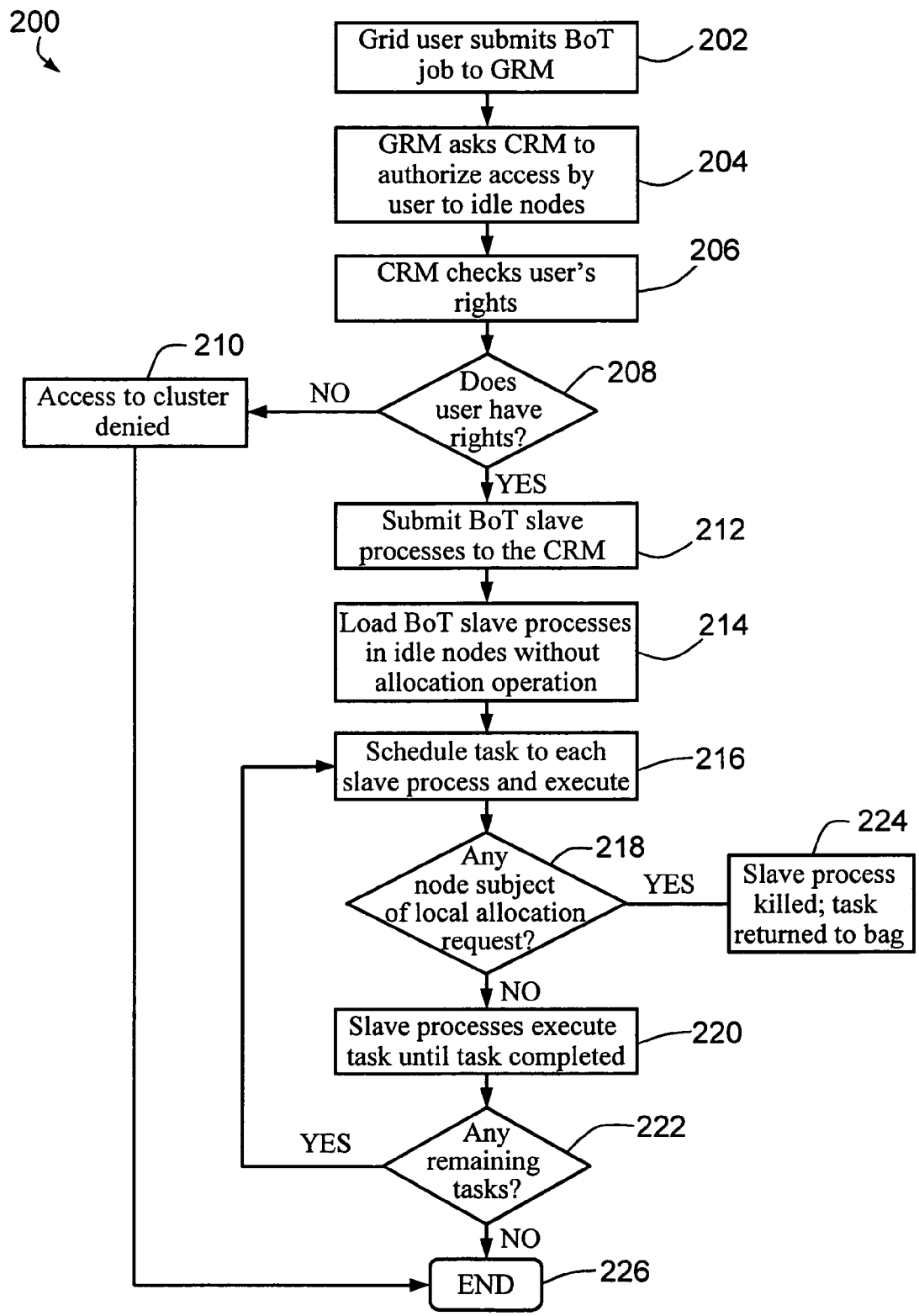
FIG. 2 is a flow diagram of the procedure by which a BoT application is executed on the cluster of FIG. 1.

Referring to FIG. 3, in another embodiment the necessary software for effecting the procedure of FIG. 2 is provided on a CD-ROM 300.

FIG. 3 is a schematic view of a data storage medium 300 according to another embodiment. The data storage medium 300 is in the form of a CD-ROM 302 that contains program instructions for effecting the procedure for executing a bag of tasks application as described above by reference to FIGS. 1 and 2. It will be understood that, in this embodiment, the particular type of data storage medium may be selected according to need or other requirements. For example, instead of CD-ROM 302 the data storage medium 300 could be in the form of a magnetic medium, but essentially any data storage medium will suffice. Indeed, the user need not be aware of which type of data storage medium is used, as the actual data storage medium could be located and accessed remotely.

The above embodiments have various advantages. They allow Grid users full access to local cluster resources for BoT applications without any interference for the local users, while providing priority to local users when accessing their cluster resources.

These embodiments allow cluster managers to share available resources with the Grid without interference with the local allocation of cluster resources, since BoT processes are be killed if the nodes are needed. BoT users may sometimes lose slave processes to local cluster allocations but they will have unrestricted access to all idle resources of the cluster.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method of executing a plurality of tasks of an application in a cluster of nodes that forms a part of or constitutes a distributed computing system, the cluster having a cluster resource manager (CRM), the method comprising:
   in a server having a grid resource manager (GRM), receiving a request for execution of the application from a remote user of the distributed computing system;
   requesting, by the GRM, that the CRM authorize the remote user to access any idle nodes of the cluster;
   if the CRM authorizes the remote user to access the idle nodes of the cluster, submitting, by the GRM, the tasks and a plurality of processes to the CRM; the CRM then:
   loading as many of the processes as there are idle nodes without allocating any task to any particular idle node;
   sequentially scheduling the tasks to the processes;
   executing the tasks by the processes until the node in which a particular process is loaded is preempted by a local allocation request, and
   rescheduling any preempted tasks to another process.

2. A method as claimed in claim 1 further comprising:
   the CRM identifying and notifying the GRM of any newly idle nodes;
   the GRM submitting additional processes to the CRM for each of the newly idle nodes, and
   the CRM loading each of said additional processes in one of said newly idle nodes without allocating any task to any particular idle node.

3. A method as claimed in claim 2, wherein the distributed computing system comprises a Grid.

4. A distributed computing system for executing a plurality of tasks of an application, comprising:
   a server having a grid resource manager (GRM);
   a remote user of the distributed computing system configured to submit a request for execution of the application to the GRM; and
   a cluster of nodes forming a part of or constituting the distributed computing system, the cluster having a cluster resource manager (CRM);
   wherein the GRM is operable to request that the CRM authorize the remote user to access any idle nodes of the cluster and, if the CRM authorizes the remote user to access the idle nodes, to submit the tasks and a plurality of processes to the CRM, and
   wherein the CRM is operable to:
   load as many of the processes as there are idle nodes without allocating any to task to any particular idle node,
   sequentially schedule the tasks to the processes,
   execute the processes until the node in which the process is loaded is preempted by a local allocation request, and
   reschedule any preempted tasks to another process.

5. A system as claimed in claim 4, further comprising:
   the CRM operable to identify and notify the GRM of any newly idle nodes,
   the GRM operable to submit additional processes to the CRM for each of the newly idle nodes, and the CRM operable to load each of said additional processes in one of said newly idle nodes without allocating any task to any particular idle node.

6. A system as claimed in claim 5, wherein the distributed computing system comprises a Grid.

7. A non-transitory computer readable storage medium provided with program data that, when executed on a distributed computing system, implements a method comprising:

in a server having a grid resource manager (GRM), receiving a request for execution of a plurality of tasks of an application from a remote user of the distributed computing system having a cluster resource manager (CRM) and a cluster of nodes forming a part of or constituting the distributed computing system;

requesting, by the GRM, that the CRM authorize the remote user to access any idle nodes of the cluster;

if the CRM authorizes the remote user to access the idle nodes of the cluster, submitting, by the GRM, the tasks and a plurality of processes to the CRM; the CRM then:

loading as many of the processes as there are idle nodes without allocating any task to any particular idle node;

sequentially scheduling the tasks to the processes;

executing the tasks by the processes until the node in which a particular process is loaded is preempted by a local allocation request, and rescheduling any preempted tasks to another process.

8. A non-transitory computer readable storage medium as claimed in claim 7, further implementing a method comprising:

the CRM identifying and notifying the GRM of any newly idle nodes;

the GRM submitting additional processes to the CRM for each of the newly idle nodes, and the CRM loading each of said additional processes in one of said newly idle nodes without allocating any task to any particular idle node.

* * * * *